United States Patent [19]
Watanabe

[11] Patent Number: 4,964,490
[45] Date of Patent: Oct. 23, 1990

[54] PIN TYPE DISC BRAKE

[75] Inventor: Namio Watanabe, Saitama, Japan

[73] Assignees: Akebono Brake Industry Co., Ltd., Tokyo; Akebona Research and Development Centre Ltd., Saitama, both of Japan

[21] Appl. No.: 349,543

[22] Filed: May 9, 1989

[30] Foreign Application Priority Data

May 24, 1988 [JP] Japan .................. 63-68197[U]

[51] Int. Cl.⁵ .................................... F16D 65/02
[52] U.S. Cl. .................. 188/73.44; 411/104; 411/213; 411/320; 411/432
[58] Field of Search ........... 188/73.43, 73.44, 73.45; 411/91, 213, 320, 104, 169, 432, 973

[56] References Cited

U.S. PATENT DOCUMENTS

| 2,360,626 | 10/1944 | Weiser | 411/213 |
| 3,464,523 | 9/1969 | Machek | 188/73.43 |
| 4,042,074 | 8/1977 | Ishihara | 188/73.45 |
| 4,084,666 | 4/1978 | Karasudani | . |
| 4,106,595 | 8/1978 | Kimura et al. | . |
| 4,296,843 | 10/1981 | Nishiyama et al. | 188/73.43 |
| 4,574,922 | 3/1986 | Varin et al. | 188/73.45 X |

FOREIGN PATENT DOCUMENTS

| 879514 | 8/1971 | Canada | 188/73.45 |
| 2514385 | 10/1975 | Fed. Rep. of Germany | 188/73.45 |
| 109736 | 6/1983 | Japan | 188/73.44 |
| 1562826 | 3/1980 | United Kingdom | . |
| 2093135 | 8/1982 | United Kingdom | . |

Primary Examiner—George E. A. Halvosa
Attorney, Agent, or Firm—Sughrue, Mion, Zinn, Macpeak & Seas

[57] ABSTRACT

The pin type disc brake in which a guide pin is inserted from a boss hole of a second extension arm of a caliper to a boss hole of a first extension arm thereof, the guide pin has a threaded end to which a nut is screwed, a member for preventing the guide pin from moving along the axis of the disc is fitted in a recessed portion formed on the first extension arm of the caliper, and a member for preventing the guide pin from rotating is abutted against a flat surface of an abutment portion formed on the first extension arm of the caliper.

6 Claims, 1 Drawing Sheet

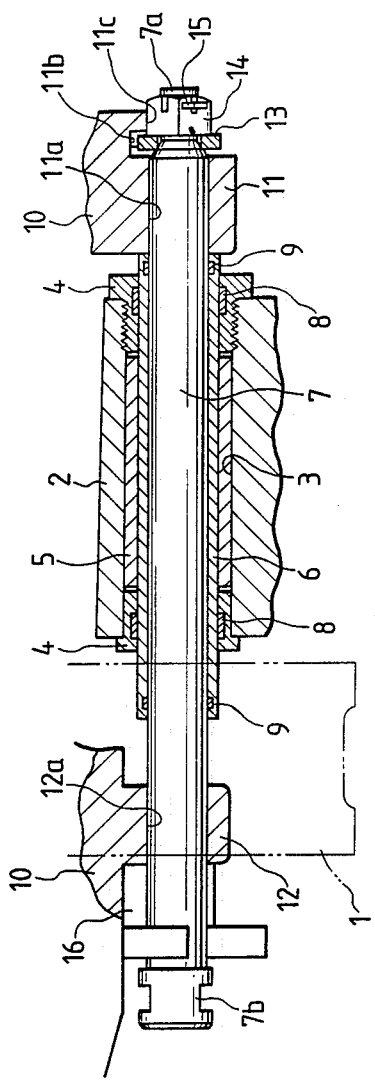
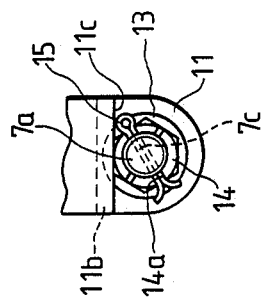
FIG. 1
FIG. 2

PIN TYPE DISC BRAKE

BACKGROUND OF THE INVENTION

The present invention relates to a pin type disc brake for use in a vehicle, more particularly to the pin type disc brake having an improved slide support mechanism thereof.

Generally, a pin type disc brake is known to be installed so as to stride over a periphery of a rotatable disc. The pin type disc brake is provided with a caliper which urges a pair of friction pads into frictional engagement with the disc and a support member supporting the caliper to be movable on the axis of the disc. The support member is fixed to a stationary part of the vehicle at one side of the disc and extends to the vicinity of the periphery of the disc. The slide support mechanism is provided with a guide pin fixed to one of the caliper and the support member, which pin is slidably fitted to a through hole provided in the other of the caliper and the support member.

In case of a disc brake of a relatively large size, a guide pin is inserted into a through hole provided in a support member directly or through a sleeve so as to slidably be fitted to the through hole, and both ends of the guide pin are engaged with a pair of extension arms formed on the caliper. Normally, there may be a pair of such a slide support mechanism installed at both the sides of the caliper which is separately disposed on a circumferential direction of the disc.

In the slide support mechanism thus constructed, it is required to simplify the insertion and removal of the guide pin in consideration of protecting a slide supporting surface and exchanging the friction pads, to simplify the workability in assembling the mechanism, to reduce the number of parts, to reduce the weight of parts such as a guide pin and the like while maintaining a required mechanical strength and durability, and so forth. In the disc brake of relatively large size as mentioned above and disclosed in U.S. Pat. No. 4,084,666, a guide pin is inserted into a through hole formed in a support member being slidable therewith. Both the ends of the guide pin are fitted in boss holes of a pair of extension arms formed on the caliper, so that the pair of extension arms are fastened tight by a large diameter head formed at one side of the guide pin and a nut screwed to a threaded part formed at the other side of the guide pin. However, such a structure would be disadvantageous in that an extension force as a reaction of the fastening would be applied to the guide pin.

Further, in the conventional disc brake, a load is applied to the caliper when the brake is actually performed and, therefore, an extra large extension force would be applied to the guide pin. For this reason, the guide pin has been required to have a relatively large diameter since when a pair of friction pads are urged into frictional engagement with the rotating disc, as a reaction of this, a large force is applied to the caliper, which force acts to expand the pair of arms of the caliper.

SUMMARY OF THE INVENTION

In view of the above-noted defects of the conventional mechanism, an object of the present invention is to provide a pin type disc brake having a slide support mechanism in which a guide pin is simplified in shape.

Another object of the invention is to provide a pin type disc brake which is improved in durability and workability during assembling the guide pin.

The foregoing and other objects have been achieved by the provision of a pin type disc brake having a slide support mechanism which, according to the present invention, is provided with a disc rotatable with a vehicle wheel, a support member fixed to a stationary part of the vehicle at one side of the disc, which member extends to the vicinity of a periphery of the disc, the support member having a through hole extending toward an axial direction of the disc, a caliper striding over the periphery of the disc, which caliper urges a pair of friction pads into frictional engagement with the disc, the caliper has first and second extension arms extending to a circumferential direction of the disc at both sides of the disc, each of the arms is provided with a boss hole which has a common axis, a guide pin inserted into the through hole of the support member and slidable therewith and fitted in the boss holes of the first and second extension arms.

The pin type disc brake of the present invention constructed above is characterized in that the guide pin is inserted from the boss hole of the second extension arm to the boss hole of the first extension arm, the guide pin has a threaded portion at one end thereof to which a nut is screwed, a member for preventing the guide pin from moving along the axis of the disc is fitted in a recessed portion formed on the first extension arm, and a member comprised by the nut for preventing the guide pin from rotating abuts an abutment portion formed on the first extension arm.

BRIEF DESCRIPTION OF THE DRAWINGS

FIG. 1 is a cross sectional view showing a slide support mechanism of a pin type disc brake embodying the present invention.

FIG. 2 is a side view showing the slide support mechanism of FIG. 1.

DESCRIPTION OF THE PREFERRED EMBODIMENTS

A preferred embodiment of the present invention will now be described in detail with reference to accompanying drawings.

FIG. 1 is a cross sectional view showing a slide support mechanism of a pin type disc brake embodying the present invention, and FIG. 2 is a side view showing the slide support mechanism of FIG. 1.

In FIG. 1, a support member 2 is fixed to a stationary portion of a vehicle at one side of a disc 1 which is rotatable with a vehicle wheel. The support member is arranged to extend to the vicinity of a periphery of the disc 1, and provided with a through hole 3 extending along an axis of the disc 1. Plugs 4 are fitted in both opening ends of the through hole 3. A resilient sleeve 5 is inserted into the through hole 3 of the support member 2 so that the sleeve 5 is positioned between the plugs 4. A rigid sleeve 6 is inserted into central holes of the plugs 4 and the resilient sleeve 5 thereby elastically fitting in the resilient sleeve 5. The rigid sleeve 6 may preferably be made of metal or plastics. A guide pin 7 passes through the rigid sleeve 6 so that the pin 7 is slidable with respect to the rigid sleeve 6. Seal rings 8 and 9 are fitted at inner surfaces of the plugs 4 and rigid sleeve 6, respectively, as shown in FIG. 1.

The guide pin 7 extends across the outer periphery of the disc 1 and both the sides are mounted to a caliper 10 in such a manner described hereinbelow.

The caliper 10 is disposed such that it strides over an outer periphery of the disc 1 for urging a pair of friction pads into frictional engagement with the disc 1. The caliper 10 is provided at two positions in the axial direction of the disc 1 with first and second extension arms 11, 12 extending toward a circumferential direction of the disc 1. Each of the first and second extension arms 11 and 12 has a boss hole 11a, 12a, respectively, having a common axis.

The guide pin 7 is inserted into the boss hole 12a of the second extension arm 12 from the left side thereof in FIG. 1, and passes through the rigid sleeve 6 and the boss hole 11a of the first extension arm 11 to protrude from the boss hole 11a.

The guide pin 7 is provided with a threaded part 7a having a small diameter at one end thereof (right side end in FIG. 1), and with a non-circular head 7b at the other end thereof, which may be hexagonal or the like.

A washer 13 is mounted on and subsequently a nut 14 having a groove 14a is screwed on the threaded part 7a of the pin 7. The washer 13 and the nut 14 are disposed to abut the first extension arm 11 of the caliper 10, as follows. That is, a part of the washer 13 is fitted in a recessed portion 11b of the first extension part 11, thereby preventing the guide pin 7 from moving in the axial direction of the disc 1. The nut having a groove 14a has a hexagonal side portion which is abutted against a flat surface of an abutment portion 11c of the extension arm 11, thereby preventing the guide pin 7 from rotating. The washer and the nut 14 having a groove 14a may be a unitary member. In this case, the nut may be provided with a flange performing as a washer and, therefore, the parts are reduced in number.

The nut having a groove 14a is screwed on the guide pin 7 by rotating the non-circular head 7b with a tool.

A cotter pin 15 is inserted into the groove 14a of the nut 14 and a through hole 7c which is formed in the threaded part 7a in a radial direction thereof. Then, an end of the cotter pin 15 is caulked thereby preventing the nut 14 from rotating with respect to the guide pin 7. Thus, the nut 14 and pin 7 will not loosen.

The caliper 10, as publicly known as disclosed in U.S. Pat. No. 4,084,666, e.g., has a piston-cylinder mechanism at one side of the disc 1 so as to press one of friction pads against one surface of the disc 1, and by a reaction of this, sides in the axial direction of the disc 1 so as to press the other friction pad against the other surface of the disc 1. The side of the disc 1 where the piston-cylinder mechanism is positioned is normally called an inner side, while the other side of the inner-side is called an outer-side. In this regard, the right side in FIG. 1 is the inner-side and, therefore, as is apparent from FIG. 1 that the guide pin 7 is inserted into the slide support mechanism from the outer-side. Normally, the outer-side is an outer side of the vehicle since it would be easy to mount the guide pin 7 from the outside of the vehicle.

In the embodiment described above, the friction pad at the inner-side (not shown) is supported by the support member 2 and that 16 at the outer-side is supported by the guide pin 7. However, the invention is not limited thereto or thereby.

Further, FIG. 1 merely shows a slide support mechanism of one side of the caliper. However, another slide support mechanism may be installed at the other side of the caliper, so that a pair of the slide support mechanisms supports the caliper movable on the axial direction of the disc.

According to the mechanism of the invention constructed as described above, the guide pin is not fastened tight to the caliper so that no undesirable extension force would be applied to the guide pin. Therefore, where a diameter of the pin is the same as that in the conventional mechanism, the guide pin of the invention is improved in durability. In other words, where it is desired to attain the same mechanical strength and durability of the pin between the conventional and present mechanisms, the guide pin of the invention can have a reduced diameter.

Furthermore, the mechanism of the invention can be installed simply by inserting and screwing the guide pin 7 in the mechanism. No loosening of the pin would occur. Accordingly, productivity is much improved.

What is claimed is:

1. A pin type disc brake for use in a vehicle, comprising:
    a disc rotatable with a vehicle wheel;
    a support member fixed to a stationary part of the vehicle, said support member being disposed to extend to the vicinity of a periphery of said disc, said support member being provided with a through hole extending along an axis of said disc;
    a caliper disposed to stride over the periphery of said disc, said caliper urging a pair of friction pads into frictional engagement with said disc, said caliper being provided at two positions on the axis of said disc with a first and a second extension arm extending along a circumferential direction of said disc, both said first and second extension arms being provided with boss holes which have a common axis, said first extension arm being provided with a recessed portion and an abutment portion having a flat surface;
    a guide pin inserted in said through hole of said support member so as to be slidable therewith, said guide pin being fitted in boss holes of said first and second extension arms, said guide pin having a threaded portion at one end thereof;
    means for preventing said guide pin from moving along the axis of said disc fitted in said recessed portion of said first extension arm; and
    means for preventing said guide pin from rotating having a flat face abutting said flat surface of said abutment portion of said first extension arm and being screwed to said threaded portion of said guide pin,
    wherein said guide pin is inserted from said boss hole of said second extension arm to said boss hole of said first extension arm.

2. The pin type disc brake of claim 1, wherein said axial movement of said guide pin preventing means is a washer mounted on said threaded portion of said guide pin, and said guide pin rotation preventing means is a nut screwed to said threaded portion of said guide pin thereby fastening said washer to said threaded portion.

3. The pin type disc brake of claim 2, further comprising means for preventing a relative rotation of said guide pin and said nut, which being disposed therebetween.

4. The pin type disc brake of claim 3, wherein said guide pin is provided at said threaded portion thereof a through hole along a radial direction of said pin, said nut is provided with a groove, and said relative movement preventing means is a cotter pin inserted in said groove of said nut and in said through hole of said guide pin, an end of said cotter pin is caulked.

5. The pin type disc brake of claim 1, wherein said guide pin is provided with a non-circular head at the other end thereof by which said guide pin is screwed.

6. The pin type disc brake of claim 1, wherein said guide pin rotation preventing means is a nut having a flange acting as said guide pin axial movement preventing means.

* * * * *